O. A. NELSON.
BUGGY SHAFT HOLDER AND ANTIRATTLER.
APPLICATION FILED APR. 30, 1915.
1,166,710.
Patented Jan. 4, 1916.
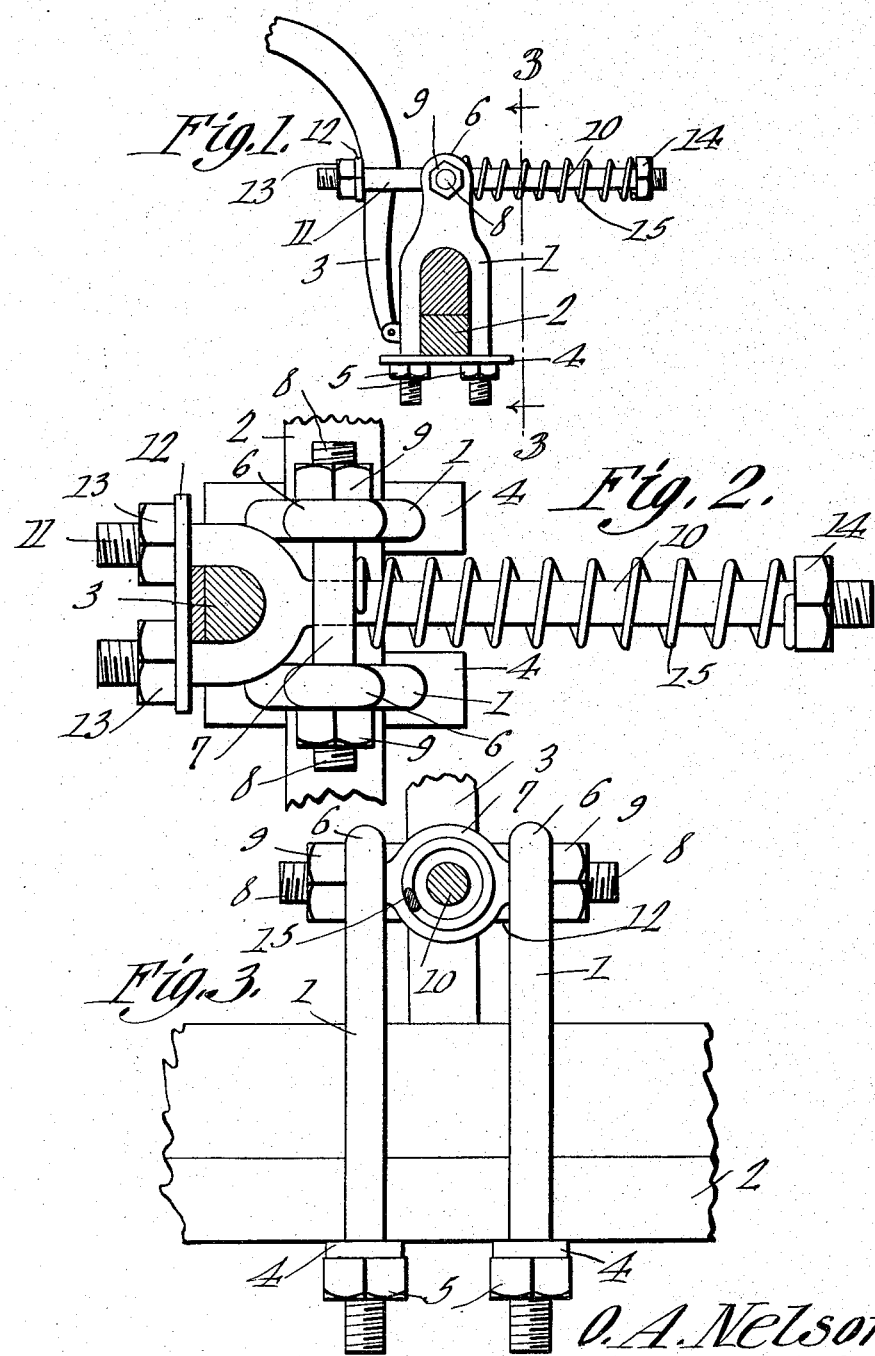
Witnesses
O. A. Nelson
Inventor
by
Attorneys

UNITED STATES PATENT OFFICE.

OSCAR A. NELSON, OF MORA, MINNESOTA.

BUGGY-SHAFT HOLDER AND ANTIRATTLER.

1,166,710.  Specification of Letters Patent.  Patented Jan. 4, 1916.

Application filed April 30, 1915. Serial No. 24,987.

*To all whom it may concern:*

Be it known that I, OSCAR A. NELSON, a citizen of the United States, residing at Mora, in the county of Kanabec and State of Minnesota, have invented a new and useful Buggy-Shaft Holder and Antirattler, of which the following is a specification.

The present invention relates to a device which is attachable to the front axle of a buggy or other vehicle and which is engageable with the shaft or thill for yieldably holding the shaft in proper position, and for preventing the rattling of the shaft.

It is the object of the invention to provide a shaft holder and anti-rattler of novel and improved construction, whereby it may be readily applied to the axle and shaft of a buggy to carry out the desired objects in a satisfactory and efficient manner.

It is also within the scope of the invention to provide an appliance of the nature indicated, which is simple and inexpensive in construction, which may be readily manufactured and installed, and which is practical and serviceable in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a side elevation of the device as applied to an axle and shaft. Fig. 2 is an enlarged plan view of the device. Fig. 3 is an enlarged sectional view taken on the line 3—3 of Fig. 1.

In carrying out the invention, it being understood at the outset that one of the devices is preferably employed in connection with each shaft or thill, a pair of U-shaped clips 1 are placed astride the axle 2 at the opposite sides of the respective shaft or thill 3, and a clamping plate 4 is engaged upon the limbs of each clip 1 to bear against the bottom of the axle 2. Nuts 5 are threaded upon the limbs of the clips 1 for clamping the clips and plates or bars 4 against the axle for holding the device in place. The intermediate portions or bends of the clips 1 are provided with upstanding apertured ears or bearings 6.

An eye or bearing 7 is disposed between the bearings 6 and is provided with oppositely projecting trunnions 8 which are journaled through the bearings 6, and nuts 9 are threaded upon the trunnions 8 to bear against the remote sides of the bearings 6, for holding the eye or bearing 7 in place. The bearing 7 is arranged to oscillate about a horizontal axis parallel with the axle 2.

A stem or rod 10 is slidable through the bearing 7, and is provided at its forward end with a fork 11 for receiving the shaft 3. A clamping bar or plate 12 is engaged upon the arms of the fork 11, and nuts 13 are threaded upon said arms to clamp the shaft 3 between the crotch of the fork and the bar 12, but allowing the fork to shift or swing slightly relative to the shaft.

A nut 14 is threaded upon the rear end portion of the stem 10 and a coiled wire expansion spring 15 is disposed upon said stem between the nut 14 and bearing 7. The spring 15 moves the stem 10 rearwardly to bring the fork 11 adjacent the bearing 7, and whereby the shaft 3 will be swung upwardly and held in proper position, although the shaft may yield downwardly. The tension of the spring 15 may be regulated by adjusting the nut 14.

The spring 15 will therefore yieldably support the shaft 3 in proper position, to prevent the shaft dropping onto the ground, and when the shaft is moved downwardly, the stem 10 will be pulled forwardly against the tension of the spring 15. The stem 10 slides through the oscillatory bearing 7 when the shaft is swung upwardly and downwardly. The spring 15 not only tends to uphold the shaft 3, but also prevents the rattling or objectionable vibration of the shaft, as will be apparent. The present device may be applied to various buggies or other vehicles, and provides a desirable appliance for the intended purposes.

Having thus described the invention, what is claimed as new is:

In a vehicle shaft holder, a pair of clips adapted to straddle a vehicle axle and having upstanding ears, a bearing between said ears having trunnions journaled therein, a stem slidable through said bearing and having a fork at its forward end for receiving a vehicle shaft, means engageable with the arms of said fork for holding the shaft therein, and an expansion spring between the rear end of the stem and said bearing.

In testimony that I claim the foregoing as my own, I have hereto affixed my signature in the presence of two witnesses.

OSCAR A. NELSON.

Witnesses:
A. W. ANDERSON,
CHAS. J. ERICSON.

Copies of this patent may be obtained for five cents each, by addressing the "Commissioner of Patents, Washington, D. C."